US012142419B2

(12) United States Patent
Fox

(10) Patent No.: US 12,142,419 B2
(45) Date of Patent: Nov. 12, 2024

(54) INDUCTIVE TRANSMISSION ELEMENT WITH DIAGONAL SIDE WALLS

(71) Applicant: Joe Fox, Spanish Fork, UT (US)

(72) Inventor: Joe Fox, Spanish Fork, UT (US)

( * ) Notice: Subject to any disclaimer, the term of this patent is extended or adjusted under 35 U.S.C. 154(b) by 333 days.

(21) Appl. No.: 17/877,919

(22) Filed: Jul. 30, 2022

(65) Prior Publication Data

US 2022/0367110 A1 Nov. 17, 2022

(51) Int. Cl.

| | |
|---|---|
| ***H01F 38/14*** | (2006.01) |
| ***H01F 17/06*** | (2006.01) |
| ***H01F 27/38*** | (2006.01) |
| *E21B 12/00* | (2006.01) |
| *E21B 44/00* | (2006.01) |

(52) U.S. Cl.

CPC ............. *H01F 38/14* (2013.01); *H01F 17/06* (2013.01); *H01F 27/38* (2013.01); *E21B 12/00* (2013.01); *E21B 44/00* (2013.01); *H01F 2038/143* (2013.01)

(58) Field of Classification Search

CPC ........ E21B 47/12; E21B 47/122; E21B 17/02; E21B 17/028; E21B 17/003; E21B 17/00; E21B 17/0283; G08B 29/00; H01F 38/14

USPC ..................... 340/854.3, 854.4, 854.5, 854.8

See application file for complete search history.

(56) References Cited

U.S. PATENT DOCUMENTS

| | | | | |
|---|---|---|---|---|
| 2002/0135179 A1* | 9/2002 | Boyle | E21B 47/13 285/21.1 |
| 2004/0164833 A1* | 8/2004 | Hall | E21B 47/13 336/132 |
| 2005/0046590 A1* | 3/2005 | Hall | E21B 17/0283 340/854.8 |
| 2010/0175890 A1* | 7/2010 | Bray | G01V 11/002 340/855.1 |
| 2016/0237760 A1* | 8/2016 | Wall | E21B 17/003 |

* cited by examiner

*Primary Examiner* — Danny Nguyen

(57) ABSTRACT

An inductive transmission element comprising a magnetically conductive electrically insulating, MCEI, annular core. The core comprises an outer wall and an inner wall apart from the outer wall. The respective walls are joined by a planar top surface. The inner wall and the outer wall form an annular trough opening adjacent the top surface. The open annular trough comprises opposed diagonal walls that intersect the top surface and a circular region at the distal end of the opposed diagonal walls. The annular trough opening may be wider or narrower than the planar top surface between the diagonal walls and outer surface. The annular core may be disposed within an annular housing comprising a polymeric block. The diagonal walls may intersect the top surface at an angle greater than 93°. The diagonal walls may intersect the circular region at an angle greater than 93°. The top surface may be polished.

19 Claims, 10 Drawing Sheets

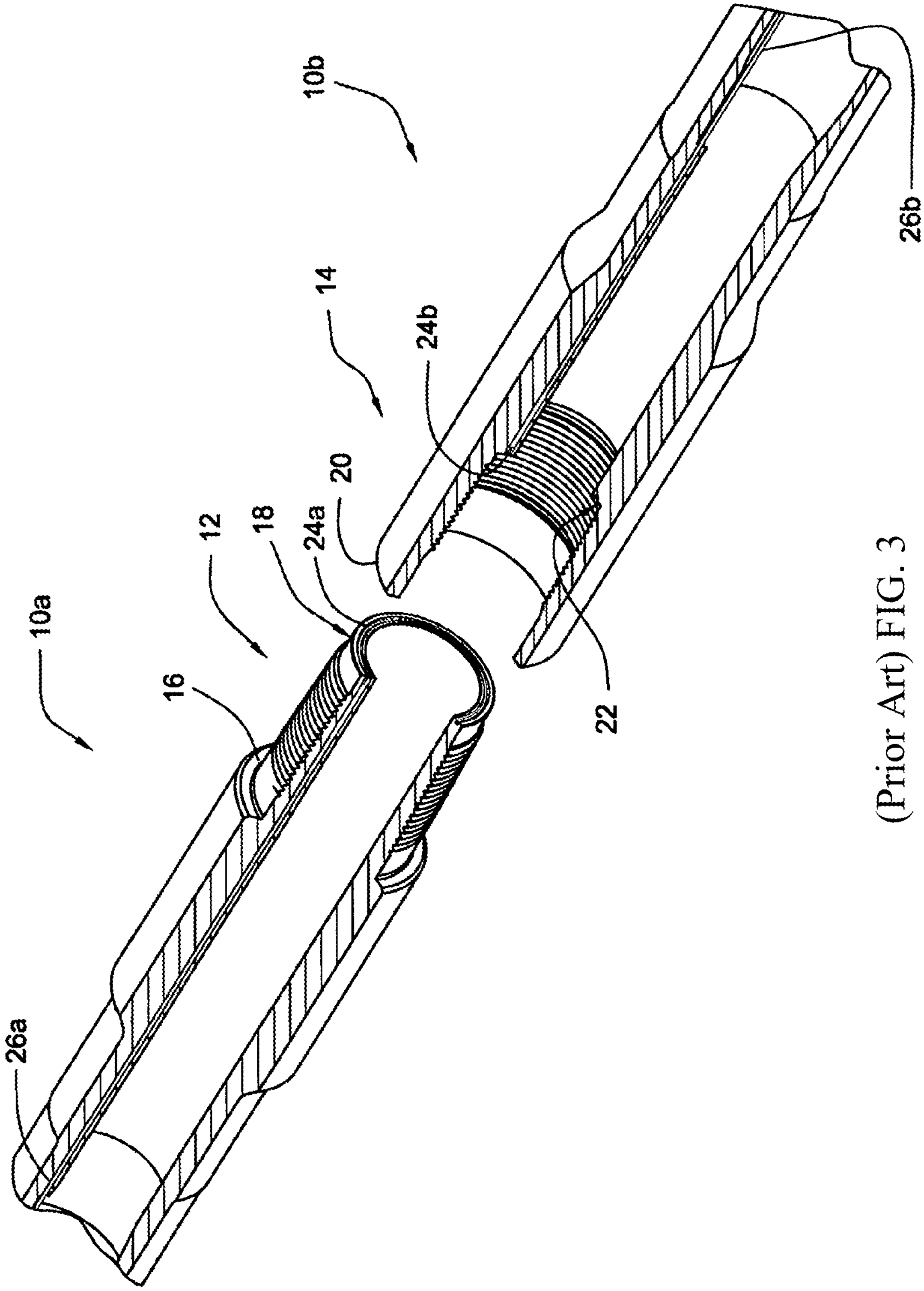
(Prior Art) FIG. 3

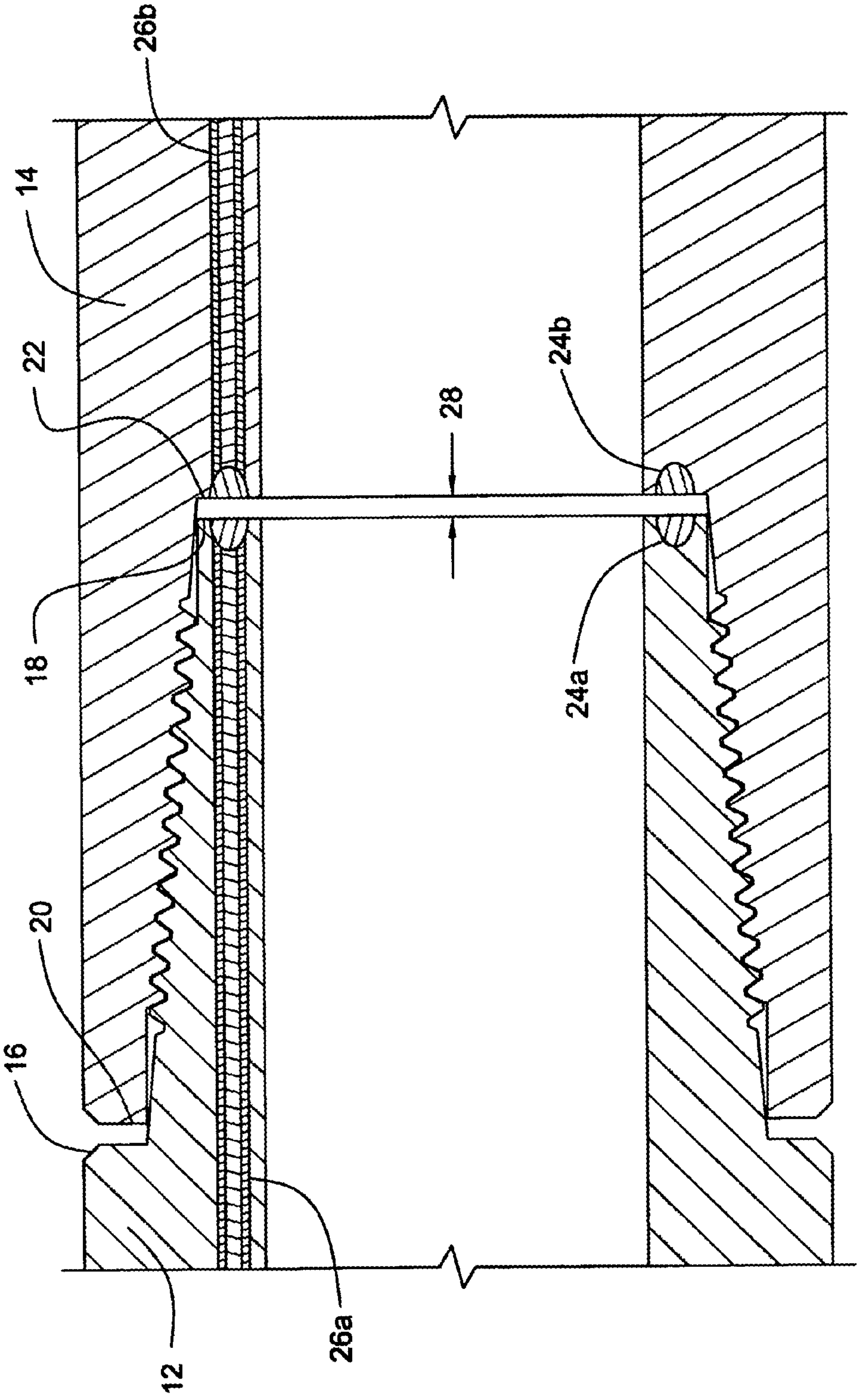
(Prior Art) FIG. 4

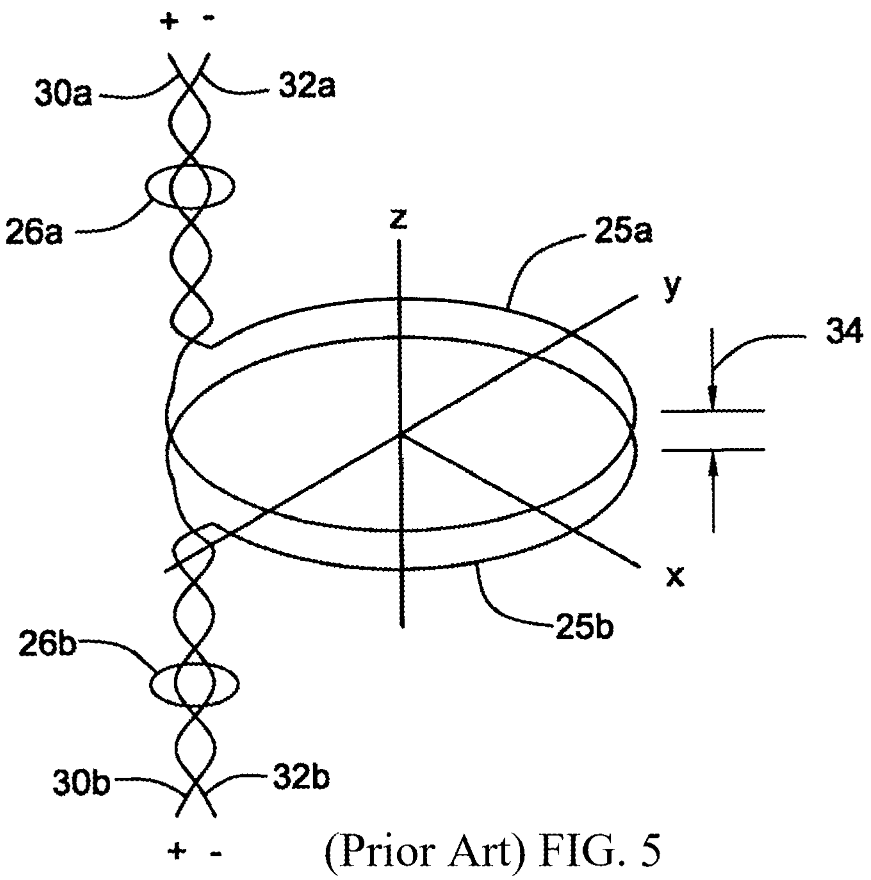
(Prior Art) FIG. 5
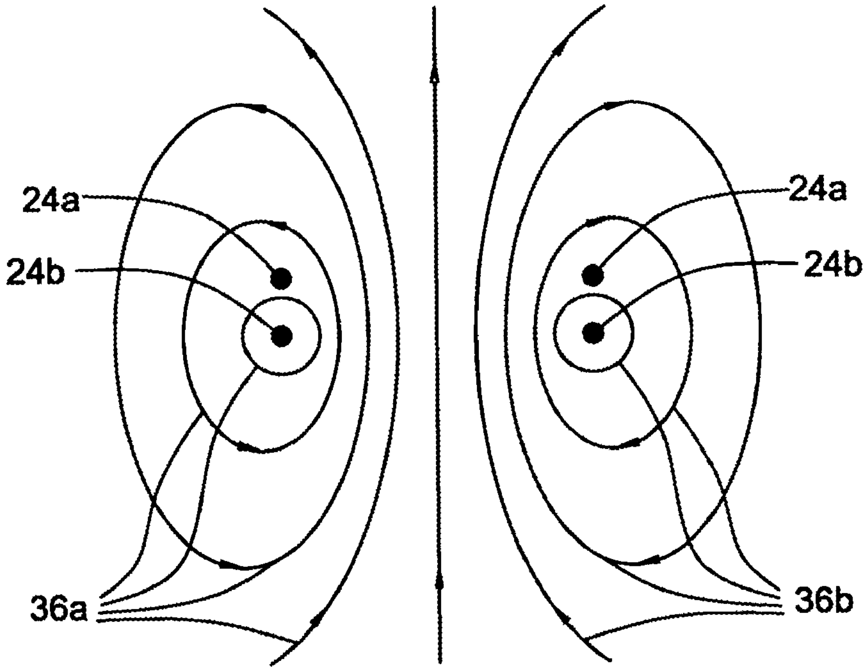
(Prior Art) FIG. 6

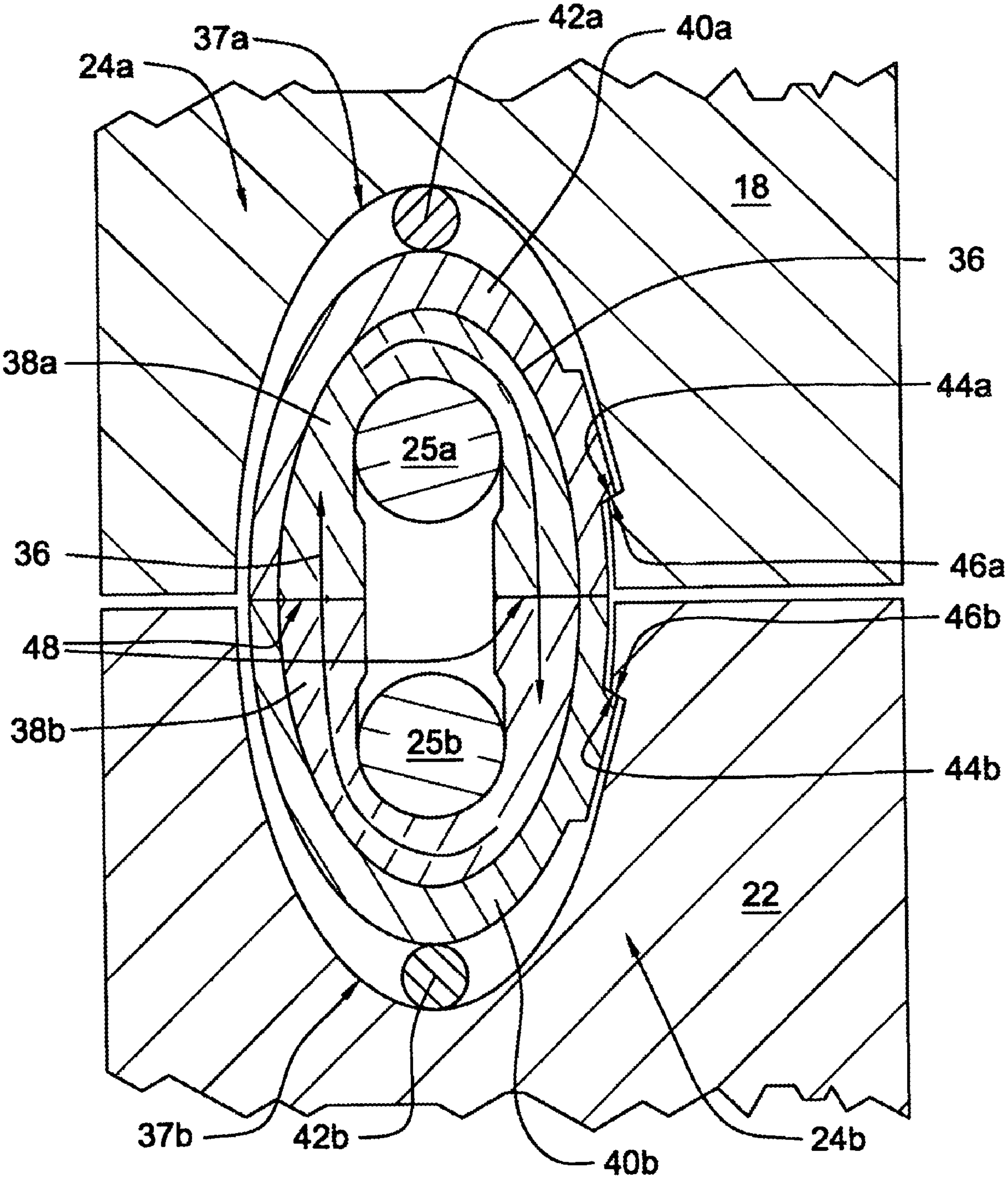
(Prior Art) FIG. 7

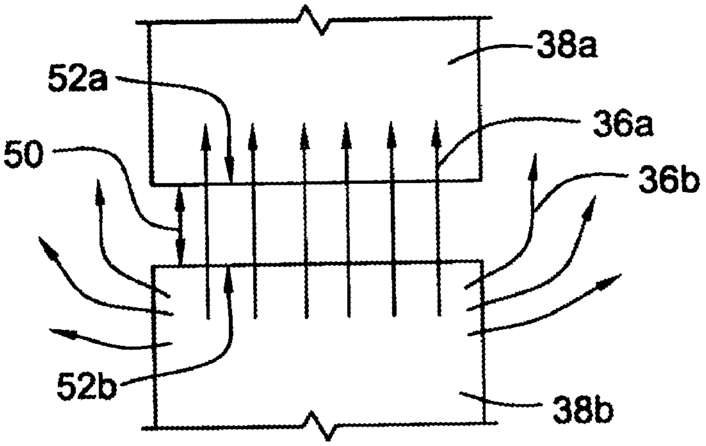
(Prior Art) FIG. 8
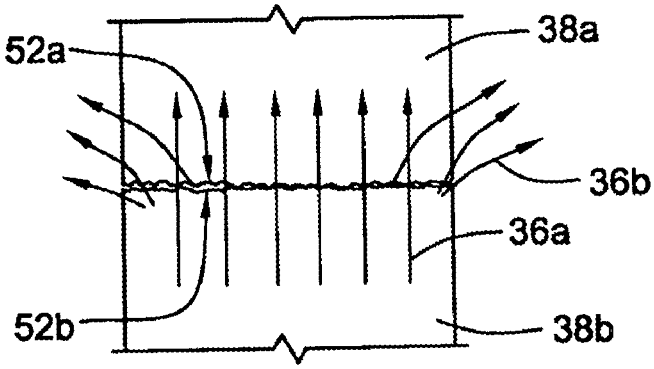
(Prior Art) FIG. 9
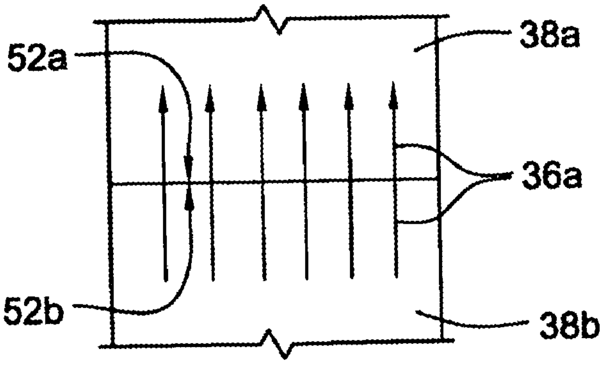
(Prior Art) FIG. 10

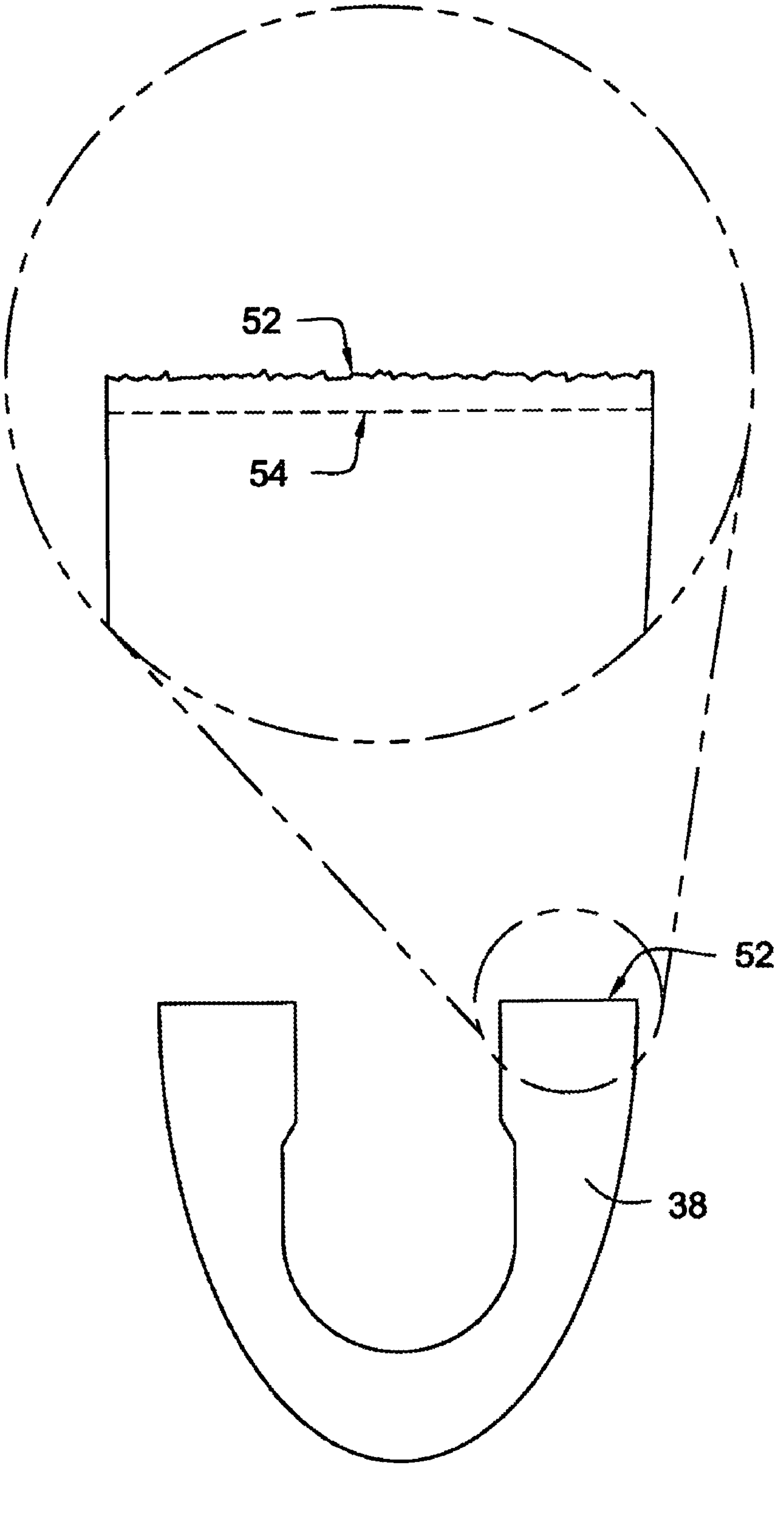
(Prior Art) FIG. 11

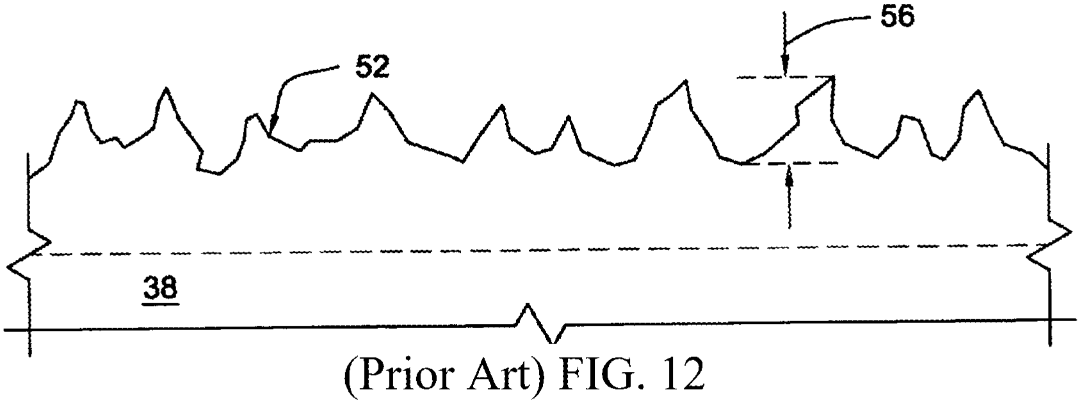
(Prior Art) FIG. 12
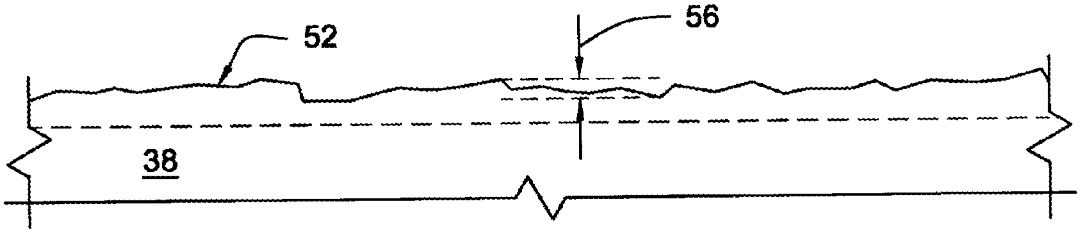
(Prior Art) FIG. 13
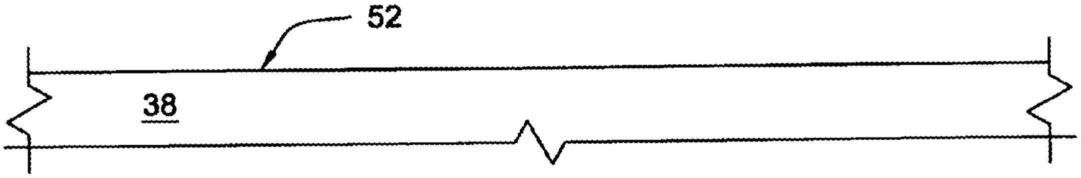
(Prior Art) FIG. 14
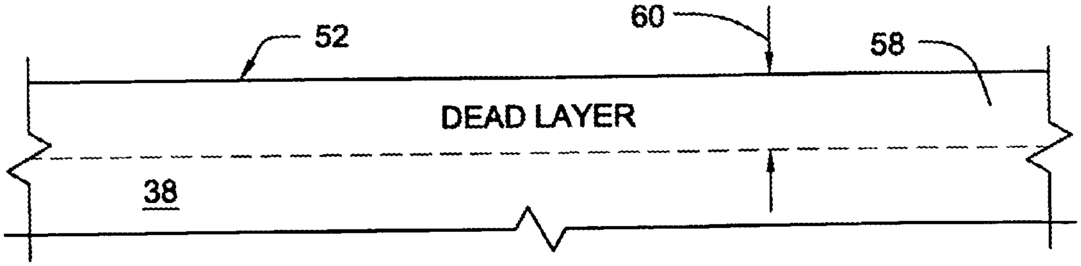
(Prior Art) FIG. 15

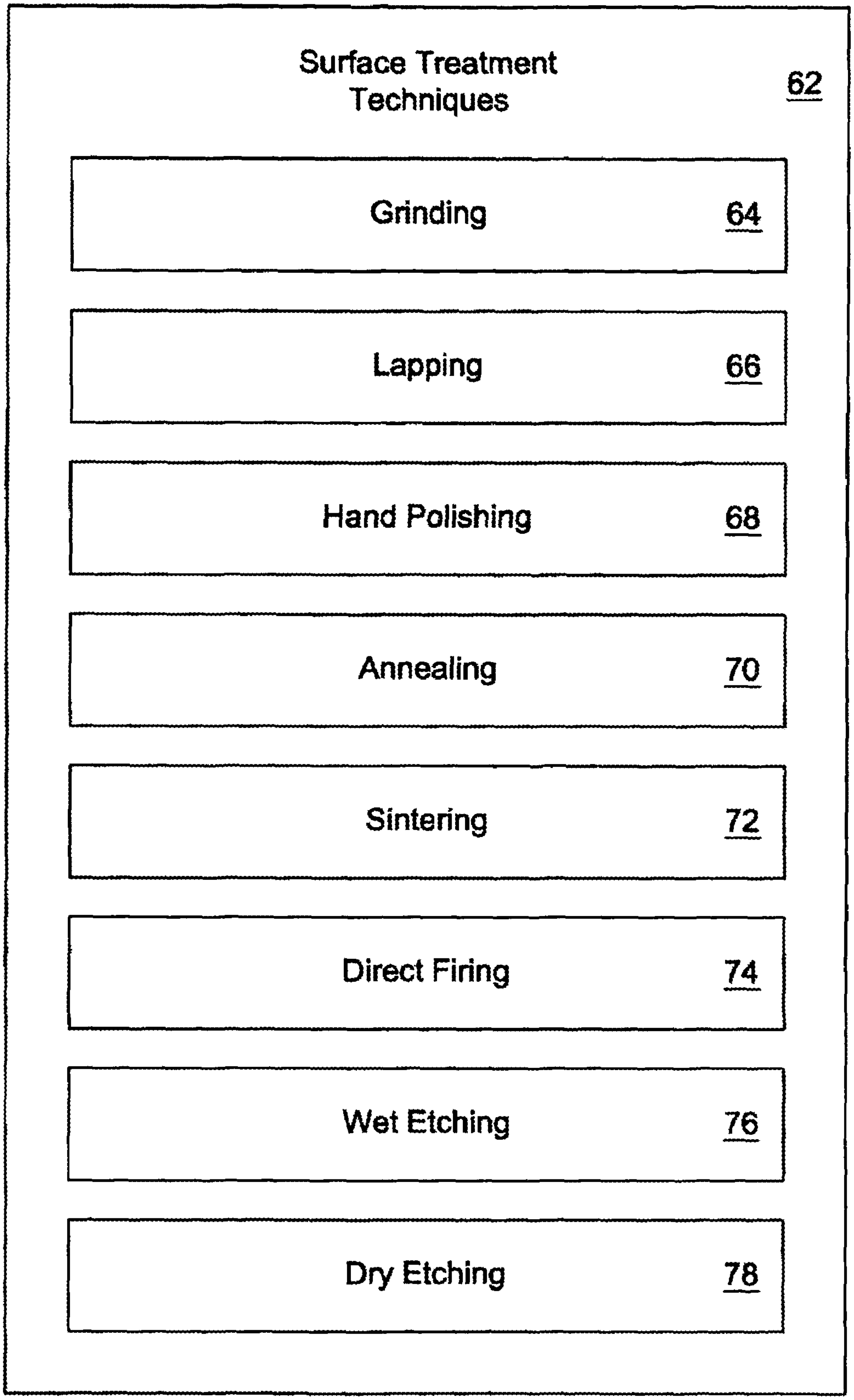
(Prior Art) FIG. 16

INDUCTIVE TRANSMISSION ELEMENT WITH DIAGONAL SIDE WALLS

RELATED APPLICATIONS

This application presents a modification and alteration of U.S. Pat. No. 7,019,665, to Hall et al., entitled Polished Downhole Transducer Having Improved Signal Coupling, issued Mar. 28, 2006, incorporated herein by this reference.

U.S. patent application Ser. No. 17/665,533, to Fox, entitled Downhole Transmission System with Perforated MCEI Segments, filed Feb. 5, 2022, is incorporated herein by this reference.

BACKGROUND OF THE INVENTION

1. Field of the Invention

This invention relates to oil and gas drilling, and more particularly to apparatus and methods for reliably transmitting information between downhole drilling components.

2. Background

Apparatus and methods are needed to effectively transmit data along downhole-drilling strings in order to transmit data from downhole components, such as tools located at or near a drilling bottom hole assembly, to the earth's surface for analysis. Nevertheless, the design of a reliable downhole transmission system is difficult due to numerous design constraints. For example, drill strings may include hundreds of sections of drill pipe and other downhole tools connected together. Data must be transmitted reliably across each tool joint to provide a continuous path between downhole tools and the surface.

Reliably transmitting data across tool joints is difficult for several reasons. First, since the tool joints are typically screwed together, each of the tools may rotate with respect to one another. In addition, as the tool joints are threaded together and primary and secondary shoulders of the drilling tools come together, the axial alignment of tools may be inconsistent. Contacts or other types of transmission elements located at the tool joint need to provide reliable connectivity despite the relative rotation and inconsistent axial alignment of downhole tools.

Moreover, the treatment and handling of drill string components may be quite harsh. For example, as sections of drill pipe or other tools are connected together before being sent downhole, ends of the drill pipe may strike or contact other objects. Thus, comparatively delicate transmission elements located at the tool ends can be easily damaged. In addition, substances such as drilling fluids, mud, sand, dirt, rocks, lubricants, or other substances may be present at or between the tool joints. This may degrade data connections at the tools joints. Moreover, the transmission elements may be subjected to these conditions each time downhole tools are connected and disconnected. Inconsistent tolerances of downhole tools may also cause signal degradation as signals travel up and down the drill string.

Inductive transmission elements or couplers provide one solution for transmitting data between downhole tools. An inductive transmission element functions by converting electrical signals to magnetic fields for transmission across the tool joint. A corresponding inductive transmission element located on the next downhole tool converts the magnetic field back to an electrical signal where it may be transmitted along the drill string.

In selected embodiments, an inductive transmission element may include a conductor to carry an electrical current and a magnetically conductive, electrically insulating, MCEI, material surrounding the conductor to provide a magnetic path for the magnetic field emanated from the conductor. The magnetically conductive, electrically insulating material, MCEI, may reduce signal loss associated with dispersion of the magnetic field.

In certain embodiments, an inductive transmission element has an annular shape. The inductive transmission element is inserted into an annular recess formed in the secondary shoulder of the pin end or box end of a downhole tool. The annular shape allows the inductive transmission element to always be oriented correctly with respect to a corresponding inductive transmission element with which it communicates. The placement of the inductive transmission element on the secondary shoulder allows the element to be protected within the downhole tool and reduces stress that would otherwise exist on the element if located on the primary shoulder.

The use of inductive transmission elements at tool joints may provide several advantages compared to the use of transmission elements using direct electrical contacts. For example, inductive transmission elements may provide more reliable contact than direct electrical contacts.

An inductive transmission element may not require direct contact with another element, whereas the electrical contact would always require direct contact. In addition, electrical contacts may cause arcing that might ignite substances present downhole such as flammable liquids or gases.

Since a drill string may extend into the earth 20,000 feet or more, it is possible that a signal may pass through hundreds of inductive transmission elements as the signal travels up or down the drill string. The failure of a single inductive transmission element may break the transmission path between the bottom hole assembly and the surface. Thus, the inductive transmission element must be robust, provide reliable connectivity, and provide efficient signal coupling. Because signal loss may occur at each tool joint, apparatus and methods are needed to reduce signal loss as much as possible to reduce the need for frequent signal repeaters along the drill string.

Thus, what are needed are apparatus and methods to improve signal coupling in downhole inductive transmission elements.

What are further needed are apparatus and methods to reduce the dispersion of magnetic energy at the tool joints.

What are further needed are apparatus and methods to provide consistent impedance and contact between transmission elements located along the drill string.

SUMMARY OF THE INVENTION

The following portion of the summary relate to FIGS. 1 and 2. The teachings of this application apply to FIGS. 1 and 2, except where modified by said FIGS.

This application presents an inductive transmission element comprising a magnetically conductive electrically insulating, MCEI, annular core. The annular core may comprise an outer wall and an inner wall spaced apart from the outer wall. The outer wall and the core may have a circular cross section. The respective walls may be joined by a planar top surface. The inner wall and the outer wall may form an annular trough opening adjacent the planar top surface. The inner wall of the open annular trough may comprise opposed diagonal walls intersecting the top surface and a circular region at the distal end of the opposed diagonal walls. The opposed diagonal walls may not be symmetrical. That is to say that the diagonal wall on one side of the annular trough may not be diagonally the same as the diagonal wall on the other side of the trough. The diagonal walls may have different lengths and angles. The diagonal walls may comprise cleats useful for containing a filler material within the trough opening.

The annular core may be disposed within a recess within an annular housing. The annular housing may comprise an annular polymeric block as shown in the '533 reference. The annular core may be molded into the polymeric block. The polymeric block may comprise a volume of MCEI particles that may allow the polymeric block to act as shielding for the magnetic field transmitted by the core.

The opposed diagonal walls may intersect the top surface at an interior angle at greater than 93°. The angle at may depend on the diameter of the core. The opposed diagonal walls may intersect the top surface an interior angle at of between 93° and 135°. Since the diagonal walls may not be symmetrical, the respective interior angles may not be identical, also. The diagonal walls, whether symmetrical on non-symmetrical may aid in controlling the magnetic field transmitted by the core.

The opposed diagonal walls may intersect the circular distal region of the trough at an interior angle at of greater than 93°. The opposed diagonal walls may intersect the circular distal region at an interior angle at of between 93° and 135°. The angle at may aid in capturing the electrical conductor or wire in the circular region of the trough.

The annular trough opening may be wider than the distance between the diagonal wall and the outer circular wall along the top surface. It may be desirable that the annular trough opening be narrower than the distance between the diagonal wall and the outer circular wall along the top surface. The width of the opening may be dependent on the diameter of the core and the application of the inductive transmission element in the tool string assembly. Once again, the width of the opening may aid in the transmission of the magnetic field across adjacent inductive transmission elements.

The annular trough opening may comprise a non-magnetically conducting, non-electrically conducting filler. The filler may be a polymer, a glass fiber, a ceramic, a natural or artificial rubber, or a combination thereof. The filler may be suitable for withstanding the high temperature and pressure conditions present downhole.

An electrical conductor such as an electrically conducting wire having a ground end 225 and a power and data transmission end 215, see the '533 reference, may be disposed within the circular region. When the electrical conductor is energized, the conductor emits an electromagnetic field that may be captured and directed by the core surrounding the conductor to an adjacent similarly configured core.

The planar top surface may be polished in order to achieve reduced surface irregularities. The polished surface may aid in inductive coupling of adjacent cores. The planar top surface may comprise a polished flatness having reduced surface irregularities lower than the adjacent surface of the housing. Also, the polished top surface may have lower surface irregularities than the surrounding downhole tool housing the inductive transmission element.

The annular core may comprise two or more perforations 315, as shown in the '533 reference. The ground end 225 of the wire may exit the core through the ground perforation 315. The power/data end of the wire 125 may exit the core through a power and data perforation 315. The perforations 315 in the core may aid in preventing magnetic field leakage making the respective coupled cores more efficient. The perforations 315 may be sealed by a gasket 265, see the '533 reference, comprising a passageway suitable for sealing the respective electrical conductor wire ends as they exit the core. The gasket 265 may comprise internal reinforcements 270/300 embedded within the gasket.

The core may comprise a plurality of annular segments. Also, the core may be a single solid ring with perforations.

In view of the foregoing, it is a primary object of the present invention to provide apparatus and methods to improve signal coupling in downhole inductive couplers. It is a further object of the invention to provide apparatus and methods to reduce the dispersion of magnetic energy at the tool joints. It is yet another object of the invention to improve current apparatus and methods by providing consistent impedance and contact between transmission elements located along the drill string Consistent with the foregoing objects, and in accordance with the invention as embodied and broadly described herein, a transmission element for transmitting information between downhole tools is disclosed in one embodiment of the invention as including an annular core constructed of a magnetically conductive electrically insulating, MCEI, material. The annular core forms an open channel around its circumference and is configured to form a closed channel by mating with a corresponding annular core along an annular mating surface. The mating surface is polished to provide improved magnetic coupling with the corresponding annular core. An annular conductor is disposed within the open channel.

In selected embodiments, grinding, lapping, hand polishing, annealing, sintering, direct firing, wet etching, dry etching, or a combination thereof, is used to polish the mating surface. In other embodiments, the mating surface is polished in multiple stages. In certain embodiments, the mating surface is treated to minimize the alteration of magnetic properties of the annular core.

In selected embodiments, a transmission element in accordance with the invention includes a biasing member configured to urge the annular core toward a corresponding annular core. The biasing member may be a spring, an elastomeric material, an elastomeric-like material, a sponge, a sponge-like material, or a combination thereof.

In certain embodiments, the annular core provides a low reluctance path for magnetic flux emanated from the annular conductor. The mating surface of the annular core may be polished to reduce the dispersion of magnetic flux passing from one mating surface to another. In selected embodiments, the magnetically conductive material is a ferrite. In other embodiments, the annular conductor comprises multiple coiled conductive strands. In yet other embodiments, the open channel of the annular core has a substantially U-shaped cross-section.

In another aspect of the invention, a method for improving signal transmission between transmission elements includes providing an annular core constructed of a magnetically conductive material. The annular core forms an open channel around its circumference and is configured to mate with a corresponding annular core along an annular mating surface, in order to form a closed channel. The method further includes polishing the mating surface to improve magnetic coupling with the corresponding annular core and placing an annular conductor in the open channel.

In selected embodiments, polishing may include a technique such as grinding, lapping, hand polishing, annealing, sintering, direct firing, wet etching, dry etching, or a combination thereof. Polishing may also include polishing the mating surface in multiple stages. In certain embodiments, a method in accordance with the invention may include treating the mating surface to minimize the alteration of magnetic properties of the annular core.

In selected embodiments, the method may include urging the annular core toward a corresponding annular core. Urging may be accomplished with a biasing member to urge the annular core toward a corresponding annular core. The biasing member may be a spring, an elastomeric material, an elastomeric-like material, a sponge, a sponge-like material, or a combination thereof.

In selected embodiments, the annular core provides a low reluctance path for magnetic flux emanated from the annular conductor. In addition, polishing of the annular core may reduce the dispersion of magnetic flux passing from one mating surface to another. In certain embodiments, the magnetically conductive material used to construct the annular core is a ferrite.

BRIEF DESCRIPTION OF THE DRAWINGS

The foregoing and other features of the present invention will become more fully apparent from the following description, taken in conjunction with the accompanying drawings. Understanding that these drawings depict only typical embodiments in accordance with the invention and are, therefore, not to be considered limiting of its scope, the invention will be described with additional specificity and detail through use of the accompanying drawings in which:

(Prior Art) FIG. 3 is a cross-sectional perspective view of one embodiment of inductive transmission elements installed or integrated into downhole tools;

(Prior Art) FIG. 4 is a cross-sectional view illustrating the relationship of inductive transmission elements communicating at the tool joint;

(Prior Art) FIG. 5 is a schematic perspective view illustrating the theory of operation of inductive transmission elements in accordance with the invention;

(Prior Art) FIG. 6 is a schematic cross-sectional view illustrating the magnetic field present around a conductive coil carrying a changing electrical current;

(Prior Art) FIG. 7 is a cross-sectional view illustrating one embodiment of transmission elements in accordance with the invention forming a closed magnetic path;

(Prior Art) FIG. 8 is a cross-sectional view illustrating the transfer of magnetic energy from one annular core to another when a gap is present;

(Prior Art) FIG. 9 is a cross-sectional view illustrating the transfer of magnetic energy from one annular core to another when the mating surfaces are irregular or rough;

(Prior Art) FIG. 10 is a cross-sectional view illustrating the transfer of magnetic energy from one annular core to another when the mating surfaces are planar and conformal;

(Prior Art) FIG. 11 is a cross-sectional view illustrating one embodiment of the mating surface of an annular core;

(Prior Art) FIG. 12 is a cross-sectional view illustrating one embodiment of a rough untreated surface;

(Prior Art) FIG. 13 is a cross-sectional view illustrating one embodiment of a partially smoothed or treated surface;

(Prior Art) FIG. 14 is a cross-sectional view illustrating one embodiment of a fully smoothed or treated surface;

(Prior Art) FIG. 15 is a cross-sectional view illustrating one embodiment of a dead layer that may exist in a smoothed or treated surface; and (Prior Art) FIG. 16 is a schematic block diagram illustrating various surface smoothing and treating techniques.

DETAILED DESCRIPTION OF THE INVENTION

It will be readily understood that the components of the present invention, as generally described and illustrated in the Figures herein, could be arranged and designed in a wide variety of different configurations. Thus, the following more detailed description of embodiments of apparatus and methods of the present invention, as represented in the Figures, is not intended to limit the scope of the invention, as claimed, but is merely representative of various selected embodiments of the invention.

The illustrated embodiments of the invention will be best understood by reference to the drawings, wherein like parts are designated by like numerals throughout. Those of ordinary skill in the art will, of course, appreciate that various modifications to the apparatus and methods described herein may easily be made without departing from the essential characteristics of the invention, as described in connection with the Figures. Thus, the following description of the Figures is intended only by way of example, and simply illustrates certain selected embodiments consistent with the invention as claimed herein.

Figure 1:
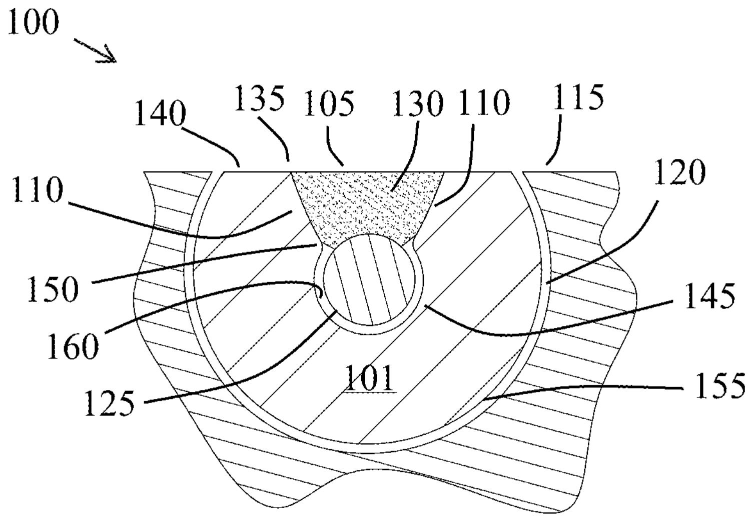
FIG. 1 is a cross section diagram of an inductive transmission element of the present invention.
Figure 2:
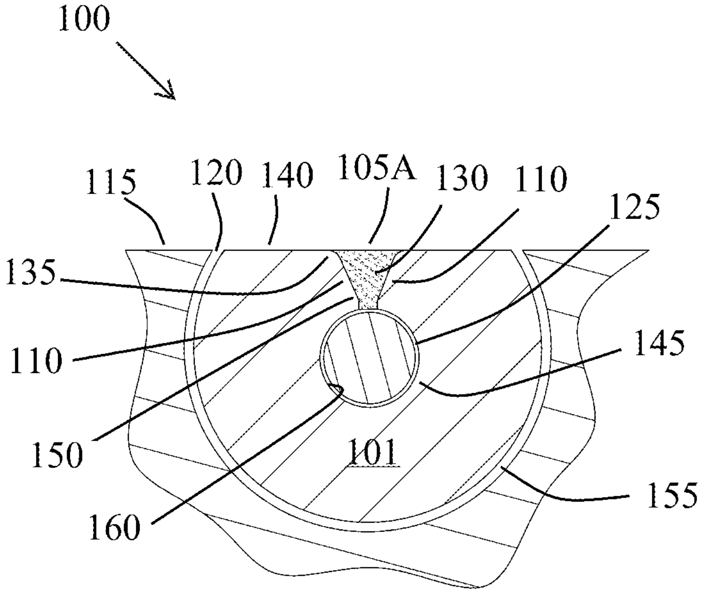
FIG. 2 is a cross section diagram of an inductive transmission element of the present invention.

The following portion of the detailed description is in reference to FIGS. 1 and 2. The descriptions of this application are applicable to said FIGS. except as modified by said FIGS.

This application presents an inductive transmission element 100 comprising a magnetically conductive electrically insulating, MCEI, annular core 101. The annular core 101 may comprise an outer wall 155 and an inner wall 160 spaced apart from the outer wall 155. The outer wall 155 and the core 101 may have a circular cross section. The respective walls may be joined by a planar top surface 140. The inner wall 160 and the outer wall 155 may form an annular trough opening 105 adjacent the planar top surface 140. The inner wall 160 of the open annular trough 105 may comprise opposed diagonal walls 110 intersecting the top surface 140 and a circular region 145 at the distal end of the opposed diagonal walls 110. The opposed diagonal walls may not be symmetrical. That is to say that the diagonal wall on one side of the annular trough may not be diagonally the same as the diagonal wall on the other side of the trough. The diagonal walls may have different lengths and angles. The diagonal walls may comprise cleats useful for containing a filler material 130 within the trough opening 105.

The annular core 101 may be disposed within a recess 120 within an annular housing 115. The annular housing 115 may comprise an annular polymeric block 205 as shown in the '533 reference. The annular core 101 may be molded into the polymeric block. The polymeric block may comprise a volume of MCEI particles that may allow the polymeric block to act as shielding for the magnetic field transmitted by the core 101.

The opposed diagonal walls 110 may intersect the top surface 140 at an interior angle at 135 greater than 93°. The angle at 135 may depend on the diameter of the core 101. The opposed diagonal walls 110 may intersect the top surface 140 an interior angle at 135 of between 93° and 135°. Since the diagonal walls may not be symmetrical, the respective interior angles may not be identical, also. The diagonal walls 110, whether symmetrical on non-symmetrical may aid in controlling the magnetic field transmitted by the core 101.

The opposed diagonal walls 110 may intersect the circular distal region 145 of the trough 105 at an interior angle at 150 of greater than 93°. The opposed diagonal walls 110 may intersect the circular distal region 145 at an interior angle at 150 of between 93° and 135°. The angle at 150 may aid in capturing the electrical conductor or wire 125 in the circular region 145 of the trough 105.

The annular trough opening 105 may be wider than the distance between the diagonal wall 110 and the outer circular wall 155 along the top surface 140. It may be desirable that the annular trough opening 105A be narrower than the distance between the diagonal wall 110 and the outer circular wall 155 along the top surface 140. The width of the opening 105 may be dependent on the diameter of the core 101 and the application of the inductive transmission element in the tool string assembly. Once again, the width of the opening 105 may aid in the transmission of the magnetic field across adjacent inductive transmission elements.

The annular trough opening 105/105A may comprise a non-magnetically conducting, non-electrically conducting filler 130. The filler 130 may be a polymer, a glass fiber, a ceramic, a natural or artificial rubber, or a combination thereof. The filler 130 may be suitable for withstanding the high temperature and pressure conditions present downhole.

An electrical conductor such as an electrically conducting wire 125 having a ground end 225 and a power and data transmission end 215, see the '533 reference, may be disposed within the circular region 145. When the electrical conductor is energized, the conductor emits an electromagnetic field that may be captured and directed by the core 101 surrounding the conductor to an adjacent similarly configured core.

The planar top surface 140 may be polished in order to achieve reduced surface irregularities. The polished surface may aid in inductive coupling of adjacent cores 101. The planar top surface 140 may comprise a polished flatness having reduced surface irregularities lower than the adjacent surface of the housing 115. Also, the polished top surface 140 may have lower surface irregularities than the surrounding downhole tool housing the inductive transmission element 100.

The annular core 101 may comprise two or more perforations 315, as shown in the '533 reference. The ground end 225 of the wire 125 may exit the core 101 through the ground perforation 315. The power/data end of the wire 125 may exit the core 101 through a power and data perforation 315. The perforations 315 in the core 101 may aid in preventing magnetic field leakage making the respective coupled cores 101 more efficient. The perforations 315 may be sealed by a gasket 265, see the '533 reference, comprising a passageway suitable for sealing the respective electrical conductor wire ends as they exit the core 101. The gasket 265 may comprise internal reinforcements 270/300 embedded within the gasket.

The core 101 may comprise a plurality of annular segments. Also, the core 101 may be a single solid ring with perforations.

Referring to (Prior Art) FIG. 3, in order to connect sections of drill pipe 10*a*, 10*b* and other downhole tools 10*a*, 10*b* together in series, each typically includes a pin end 12 and a box end 14. The pin end 12 usually has external threads that thread into internal threads of the box end 14. When connecting a pin end 12 to a corresponding box end 14, various shoulders of the tools 10*a*, 10*b* meet to provide additional structural support to the tools 10*a*, 10*b*.

For example, in selected downhole tools 10, the pin end 12 includes a primary shoulder 16 and a secondary shoulder 18. Likewise, the box end 14 includes a corresponding primary and secondary shoulder 20, 22. A primary shoulder 16, 20 is labeled as such to indicate that it provides the majority of the additional structural support to the drill pipe 10 or downhole component 10. Nevertheless, the secondary shoulder 18 may also provide significant support to the component 10.

In order to effectively monitor and control tools and sensors that are located downhole, apparatus and methods are needed to transmit information along the drill string. In order to achieve this objective, reliable apparatus and methods are needed to transmit information across tool joints where a pin end 12 connects to a box end 14.

In selected embodiments in accordance with the invention, a transmission element or coupler 24 is used to transmit data across a tool joint. For example, the transmission element 24*a* may be installed in the secondary shoulder of the pin end 12. This transmission element 24*a* is configured to transmit data to a corresponding transmission element 24*b* installed in the secondary shoulder 22 of the box end 14. Cables 27*a*, 27*b* or other transmission media 27 are connected to the transmission elements or couplers 24*a*, 24*b* to transmit data along the tools 10*a*, 10*b*.

In certain embodiments, a recess or groove is provided in the secondary shoulder 18 of the pin end 12 and in the secondary shoulder 22 of the box end 14 to accommodate each of the transmission elements 24*a*, 24*b*. The transmission elements 24*a*, 24*b* may be constructed in an annular shape to circumscribe the radius of the drill pipe 10. Since the secondary shoulder 18 of the pin end 12 may contact the secondary shoulder 22 of the box end 14, the transmission element 24*a* may sit substantially flush with the secondary shoulder 18 of the pin end 12. Likewise, the transmission element 24*b* may sit substantially flush with the surface of the secondary shoulder 22 of the box end 14.

In selected embodiments, the transmission element 24*a* converts an electrical signal to a magnetic flux or magnetic field. This magnetic field is detected by the corresponding transmission element 24*b*. The magnetic field induces an electrical current in the transmission element 24*b*. This electrical current is then transmitted from the transmission element 24*b* to the electrical cable 27*b*.

As was previously stated, downhole-drilling environments may adversely affect communication between transmission elements 24*a*, 24*b* located on successive drill string components 10. For example, materials such as dirt, mud, rocks, lubricants, or other fluids, may inadvertently interfere with the contact or communication between transmission elements 24*a*, 24*b*. In other embodiments, gaps present between a secondary shoulder 18 on a pin end 12 and a secondary shoulder 22 on a box end 14 may interfere with communication between transmission elements 24*a*, 24*b*. Thus, apparatus and methods are needed to reliably overcome these as well as other obstacles.

Referring to (Prior Art) FIG. 4, for example, as was previously stated, a gap 28 may be present between the secondary shoulders 18, 22 of the pin end 12 and box end 14. This gap 28 may be the result of variations that are present in sections 10*a*, 10*b* of pipe. In other embodiments, the gap 28 may be the result of materials such as dirt, rocks, mud, lubricants, fluids, or the like, becoming interposed between the shoulders 18, 22.

In some cases, the transmission elements 24_a_, 24_b_ may be designed such that optimal function occurs when the transmission elements 24_a_, 24_b_ are in direct contact with one another. Thus, conditions that produce a gap 28 may cause malfunction of the transmission elements 24_a_, 24_b_, thereby impeding or interfering with the flow of data. Thus, apparatus and methods are needed to improve the reliability of transmission elements 24_a_, 24_b_ even in the presence of gaps 28 or other interfering substances.

In certain embodiments, a transmission element 24_a_, 24_b_ may be moveable with respect to a shoulder 18, 22 into which it is installed. Thus, the transmission elements 24_a_, 24_b_ may be translated such that they are in closer proximity to one another. This may improve communication therebetween. In selected embodiments, the transmission elements 24_a_, 24_b_ may be designed such that direct contact therebetween provides optimal communication.

In other embodiments, some limited separation between transmission elements 24_a_, 24_b_ may still provide effective communication. As illustrated, the transmission elements 24_a_, 24_b_ are mounted in the secondary shoulders 18, 22 of the pin end 12 and box end 14, respectively. In other embodiments, the transmission elements 24_a_, 24_b_ may be installed in any suitable surface of the pin end 12 and box end 14, such as in primary shoulders 16, 20.

Referring to (Prior Art) FIG. 5, the function of the transmission elements 24_a_, 24_b_ may be illustrated by a first conductive loop 25_a_, and a second conductive loop 25_b_. The loops 25_a_, 25_b_ may be connected to a positive terminal 30_a_, 30_b_ and a negative terminal 32_a_, 32_b_, respectively. When a voltage is applied across the terminals 30_a_, 32_a_, a current is induced in the loop 25_a_. This current may produce a magnetic field around the conductor forming the loop 25_a_ in accordance with the laws of electromagnetism. The magnetic field produced by the loop 25_a_ may induce an electrical current in a second loop 25_b_, thereby creating a voltage across the terminals 30_b_, 32_b_. Thus, an electrical signal transmitted along the terminals 30_a_, 32_a_ may be reproduced on the terminals 30_b_, 32_b_.

Although an electrical signal may be successfully reproduced, the signal may lose a significant amount of power when it is transmitted from one loop 25_a_ to another 25_b_. One parameter that may affect the amount of power that is lost is the distance 34 between the loops. In certain instances, closing the gap 34 may significantly reduce loss.

Referring to (Prior Art) FIG. 6, a cross-sectional view of the loops 25_a_, 25_b_ is illustrated. As shown, a first current carrying loop 25_b_ may produce a magnetic field around the conductor 25_b_ as illustrated by magnetic field lines 36_a_, 36_b_. A second loop 25_a_ may be positioned such that selected magnetic field lines 36_a_, 36_b_ enclose the loop 25_a_, while others do not. Those field lines 36 that enclose the loop 25_a_ may be effective to induce a current in the loop 25_a_, while those that do not enclose the conductor do not induce a current and thus may be associated with signal loss. Thus, in this example, the closer the loops are placed, the better the signal coupling between the loops 25_a_, 25_b_.

Referring to (Prior Art) FIG. 7, a cross-sectional view of one embodiment of transmission elements 24_a_, 24_b_ is illustrated. In selected embodiments, transmission elements 24_a_, 24_b_ in accordance with the invention may include conductive loops 25_a_, 25_b_ surrounded by MCEI cores 38_a_, 38_b_. The MCEI cores 38_a_, 38_b_ may be inserted into housings 40_a_, 40_b_. These housings 40_a_, 40_b_ may sit within recesses or grooves or grooves 37_a_, 37_b_ formed in secondary shoulders 18, 22.

In selected embodiments, biasing members 42_a_, 42_b_ may be inserted between the housings 40_a_, 40_b_ and the recesses or grooves 37_a_, 37_b_ to urge the transmission elements 24_a_, 24_b_ together. In selected embodiments, the housings 40_a_, 40_b_ may be formed to include shoulders 44_a_, 44_b_ that may interlock with corresponding shoulders 46_a_, 46_b_, formed in the recesses or grooves 37_a_, 37_b_. This may prevent the transmission elements 24_a_, 24_b_ from exiting the recesses or grooves 37_a_, 37_b_ completely.

The magnetically conductive cores 38_a_, 38_b_ may be used to provide a magnetic path for the magnetic field emanating from the conductors 25_a_, 25_b_. When a gap exists between the two cores 38_a_, 38_b_, the magnetic path is open and magnetic energy may be lost at the gap. When the cores 38_a_, 38_b_ come together, they formed a closed path in which the magnetic flux 36 may travel. The better the junction between the cores 38_a_, 38_b_, the lower the energy loss. In certain embodiments in accordance with the invention, the interface surfaces 48 between the cores 38_a_, 38_b_ may be polished to provide improved contact therebetween, and to reduce the loss of magnetic energy.

The cores 38_a_, 38_b_ may be constructed of any suitable material having desired electrical and magnetic properties. For example, in selected embodiments various magnetically conductive electrically insulating, MCEI, "ferrites" may be suitable for use in the present invention. These materials may provide desired magnetic permeability, while being electrically insulating to prevent shorting of electrical current carried by the conductors 25_a_, 25_b_.

Referring to (Prior Art) FIG. 8, when a gap 50 is present between mating surfaces of the cores 38_a_, 38_b_, significant magnetic energy may be lost at the gap 50 as magnetic fringe patterns 36_b_ attempt to span the gap. As illustrated, selected magnetic field lines 36_a_ may span the gap 50, while others 36_b_ may be dispersed, resulting in signal loss. Thus, reducing the gap 50 as much as possible may improve signal coupling between the cores 38_a_, 38_b_.

Referring to (Prior Art) FIG. 9, in another embodiment, no gap is present between the mating surfaces 52_a_, 52_b_ of the cores 38_a_, 38_b_. Nevertheless, surface imperfections, even microscopic imperfections, may cause significant dispersion of magnetic energy 36_b_. This may also result in significant signal loss at the junction 52_a_, 52_b_. Thus, mere contact between the surfaces 52_a_, 52_b_ may be insufficient.

Referring to (Prior Art) FIG. 10, in another embodiment, the surfaces 52_a_, 52_b_ may be polished or treated. In this embodiment, the junction 52_a_, 52_b_ may closely resemble a continuous core and magnetic energy 36_a_ may be efficiently coupled from one surface 52_a_ to the other. Thus, the combination of surface contact and having surfaces 52_a_, 52_b_ that are finely polished or treated may provide the most efficient coupling of energy.

Referring to (Prior Art) FIG. 11, in selected embodiments, a core 38 may be produced that may appear to have a uniform or smooth surface. However, upon magnification, the surface may exhibit significant irregularities and imperfections that may result in significant energy dispersion. Thus, a target surface 54 may be chosen and material may be removed from the surface until the target surface 54, having a desired finish, is reached. In selected embodiments, the core material 38 may be slightly oversize when manufactured, thereby permitting a selected layer of material to be removed to provide a desired finish.

Referring to (Prior Art) FIG. 12, a surface may be treated or finished in various stages to provide a desired finish. For example, initially, the surface 52_a_ may be characterized by a roughness height 56_a_. Irregularities or peaks may be removed or smoothed using some course method of smoothing or material removal. For example, in selected embodiments, various methods of grinding may be used to remove significant surface 52*a* imperfections or irregularities. In selected embodiments, other techniques may be used to remove material, such as direct firing, wet etching, dry etching, or the like.

Referring to (Prior Art) FIGS. 13 and 14, after a course method of material removal has been completed, the surface 52*b* may be characterized by a lesser roughness or irregularity height 56*b*. A finer method of smoothing or material removal may be used to finish this surface 52*b*. For example, the surface 52 may be lapped, hand polished, finely sanded, or the like to remove these slight irregularities. In addition, it is conceivable that a technique such as annealing, sintering, direct firing, etching, or the like, may be used to further smooth the surface to yield a desired finish 52*c*.

Referring to (Prior Art) FIG. 15, smoothing the surface of the core 38 may provide various undesirable surface characteristics. For example, surface techniques, such as grinding, may leave dead layer 58 in the magnetic material. The layer 58 may not be completely "dead," but may have altered magnetic properties that may affect proper signal coupling between the cores 38. The "dead layer" may also exhibit undesired cracking or fractures. Thus, various techniques may be used to reduce the dead layer 58 or prevent occurrence of the dead layer 58. For example, in certain embodiments, successively finer and softer abrasives may be used to provide a desired surface finish and reduce the "dead layer" that may otherwise occur.

Referring to (Prior Art) FIG. 16, various surface treatment or smoothing techniques may be used alone or in combination to provide a desired finish to the core 38. For example, in selected embodiments, techniques may include grinding, lapping, hand polishing, annealing, sintering, direct firing, wet etching, dry etching, or other techniques. Selected techniques may be used to remove material, while others may be used to reduce or prevent a "dead layer" in the magnetic material.

The present invention may be embodied in other specific forms without departing from its essence or essential characteristics. The described embodiments are to be considered in all respects only as illustrative, and not restrictive. The scope of the invention is, therefore, indicated by the appended claims, rather than by the foregoing description. All changes within the meaning and range of equivalency of the claims are to be embraced within their scope.

The invention claimed is:

1. An inductive transmission element comprising:
- a magnetically conductive electrically insulating, MCEI, annular core;
- the annular core comprising a generally circular outer wall and an inner wall apart from the outer wall, the respective walls joined by a planar top surface;
- the inner wall and the outer wall forming an annular trough opening adjacent the planar top surface;
- the open trough comprising opposed diagonal walls intersecting the top surface and a circular region at the distal end of the opposed diagonal walls,
- wherein the annular trough opening is narrower than the distance between the diagonal walls and the outer circular wall along the top surface.

2. The inductive transmission element of claim 1, wherein the annular core is disposed within recess within an annular housing.

3. The inductive transmission element of claim 1, wherein the annular housing comprises an annular polymeric block.

4. The inductive transmission element of claim 1, wherein the opposed diagonal walls intersect the top surface at an interior angle greater than 93°.

5. The inductive transmission element of claim 1, wherein the opposed diagonal walls intersect the top surface at an interior angle of between 93° and 150°.

6. The inductive transmission element of claim 1, wherein the opposed diagonal walls intersect the circular distal region at an interior angle greater than 93°.

7. The inductive transmission element of claim 1, wherein the opposed diagonal walls intersect the circular distal region at an interior angle of between 93° and 150°.

8. The inductive transmission element of claim 1, wherein the annular trough opening is wider than the distance between the diagonal wall and the outer circular wall along the top surface.

9. The inductive transmission element of claim 1, wherein the annular trough opening comprises a non-magnetically conducting, non-electrically conducting filler.

10. The inductive transmission element of claim 1, wherein an electrically conducting wire having a ground end and a power end is disposed within the circular region.

11. The inductive transmission element of claim 1, wherein the planar top surface is polished.

12. The inductive transmission element of claim 1, wherein the planar top surface comprises a polished flatness having lower surface irregularities than the adjacent surface of the housing.

13. The inductive transmission element of claim 1, wherein the annular core comprises two or more perforations.

14. The inductive transmission element of claim 1, further comprising a ground end of a wire exits the core through a ground perforation.

15. The inductive transmission element of claim 1, further comprising a power end of the wire exits the core through a power perforation.

16. The inductive transmission element of claim 1, wherein the perforations are sealed by a gasket comprising a passageway suitable for sealing the respective wire ends as they exit the core.

17. The inductive transmission element of claim 1, further comprising a gasket comprising internal reinforcements embedded within the gasket.

18. The inductive transmission element of claim 1, wherein the core comprises annular segments.

19. The inductive transmission element of claim 1, wherein the core is a single solid ring comprising perforations.

* * * * *